(12) United States Patent
Okudo et al.

(10) Patent No.: US 9,587,978 B2
(45) Date of Patent: Mar. 7, 2017

(54) INFRARED SENSOR

(71) Applicant: PANASONIC CORPORATION, Osaka (JP)

(72) Inventors: Takafumi Okudo, Osaka (JP); Takahiro Miyatake, Osaka (JP); Yoshiharu Sanagawa, Osaka (JP); Masao Kirihara, Osaka (JP); Yoichi Nishijima, Osaka (JP); Takanori Aketa, Osaka (JP); Ryo Tomoida, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/301,114

(22) Filed: Jun. 10, 2014

(65) Prior Publication Data

US 2014/0291527 A1    Oct. 2, 2014

Related U.S. Application Data

(63) Continuation of application No. PCT/JP2012/079808, filed on Nov. 16, 2012.

(30) Foreign Application Priority Data

Dec. 14, 2011    (JP) .................................. 2011-273619

(51) Int. Cl.
    *G01J 1/04*    (2006.01)
    *G01J 5/00*    (2006.01)
    (Continued)

(52) U.S. Cl.
    CPC ........... *G01J 1/0411* (2013.01); *G01J 1/0407* (2013.01); *G01J 1/0437* (2013.01); *G01J 5/0025* (2013.01);
    (Continued)

(58) Field of Classification Search
    CPC ........ G01J 5/02; G01J 5/06; G01J 1/02; G01J 1/04
    (Continued)

(56) References Cited

U.S. PATENT DOCUMENTS 5,655,839 A * 8/1997 Schmidt et al. .............. 374/132
6,133,569 A * 10/2000 Shoda et al. .................. 250/332
(Continued)

FOREIGN PATENT DOCUMENTS

JP    H08-101062 A    4/1996
JP    08-261835 A    10/1996
(Continued)

OTHER PUBLICATIONS

International Search Report issued in International Application No. PCT/JP2012/079808 with Date of mailing Feb. 26, 2013,with English Translation.

*Primary Examiner* — Marcus Taningco
(74) *Attorney, Agent, or Firm* — McDermott Will & Emery LLP

(57) ABSTRACT

An infrared sensor includes: an infrared detecting device; a lens disposed above the infrared detecting device; an member that is disposed at a side of an upper surface of the lens and includes an opening; and a gap that intervenes between the member and the lens and has a wider range than the opening.

4 Claims, 5 Drawing Sheets

(51) Int. Cl.
*G01J 5/08* (2006.01)
*G01J 5/02* (2006.01)
*G01J 5/06* (2006.01)

(52) U.S. Cl.
CPC ........... *G01J 5/0235* (2013.01); *G01J 5/0806* (2013.01); *G01J 5/0831* (2013.01); *G01J 1/04* (2013.01); *G01J 5/02* (2013.01); *G01J 5/06* (2013.01)

(58) Field of Classification Search
USPC ........................................................ 250/353
See application file for complete search history.

(56) References Cited

U.S. PATENT DOCUMENTS

| | | | |
|---|---|---|---|
| 6,144,031 A * | 11/2000 | Herring et al. | 250/352 |
| 7,348,203 B2 | 3/2008 | Kaushal et al. | |
| 7,718,970 B2 | 5/2010 | Honda et al. | |
| 7,813,643 B2 * | 10/2010 | Chen | 398/106 |
| 7,874,746 B2 * | 1/2011 | Lee | 396/529 |
| 8,445,848 B2 | 5/2013 | Tsuji | |
| 2003/0071342 A1 * | 4/2003 | Honda et al. | 257/687 |
| 2004/0061799 A1 * | 4/2004 | Atarashi | G02B 7/022 348/340 |
| 2006/0016995 A1 * | 1/2006 | Kummer et al. | 250/338.1 |
| 2006/0166407 A1 | 7/2006 | Kaushal et al. | |
| 2008/0131131 A1 * | 6/2008 | Chen | 398/106 |
| 2009/0266988 A1 | 10/2009 | Honda et al. | |
| 2010/0244171 A1 * | 9/2010 | Nagamatsu et al. | 257/433 |
| 2012/0018636 A1 | 1/2012 | Tsuji | |

FOREIGN PATENT DOCUMENTS

| | | |
|---|---|---|
| JP | 09-297064 A | 11/1997 |
| JP | 2005-537473 A | 12/2005 |
| JP | 2007-171174 A | 7/2007 |
| JP | 2007-292721 A | 11/2007 |
| JP | 2010-054250 A | 3/2010 |
| JP | 2010-151639 A | 7/2010 |
| JP | 2010-237117 A | 10/2010 |
| JP | 2010-243365 A | 10/2010 |
| JP | 2011-128065 A | 6/2011 |
| JP | 2011-220938 A | 11/2011 |
| WO | 2012/063915 A1 | 5/2012 |

* cited by examiner

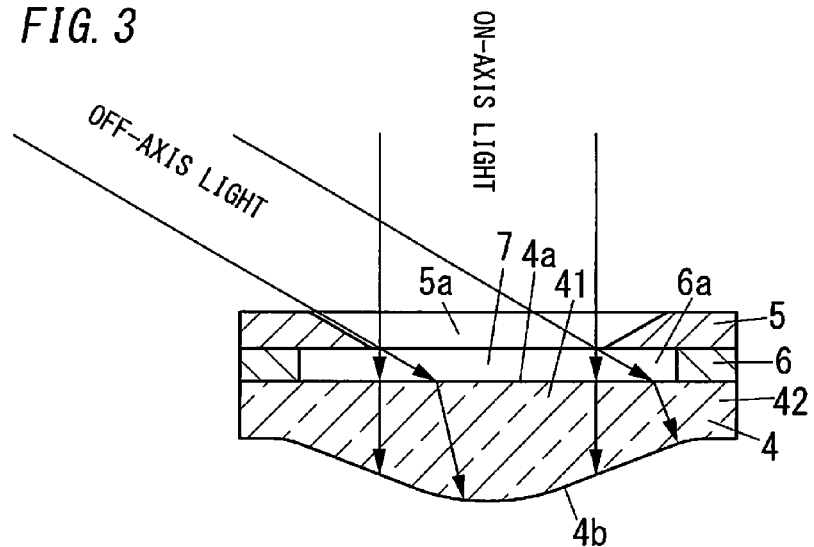
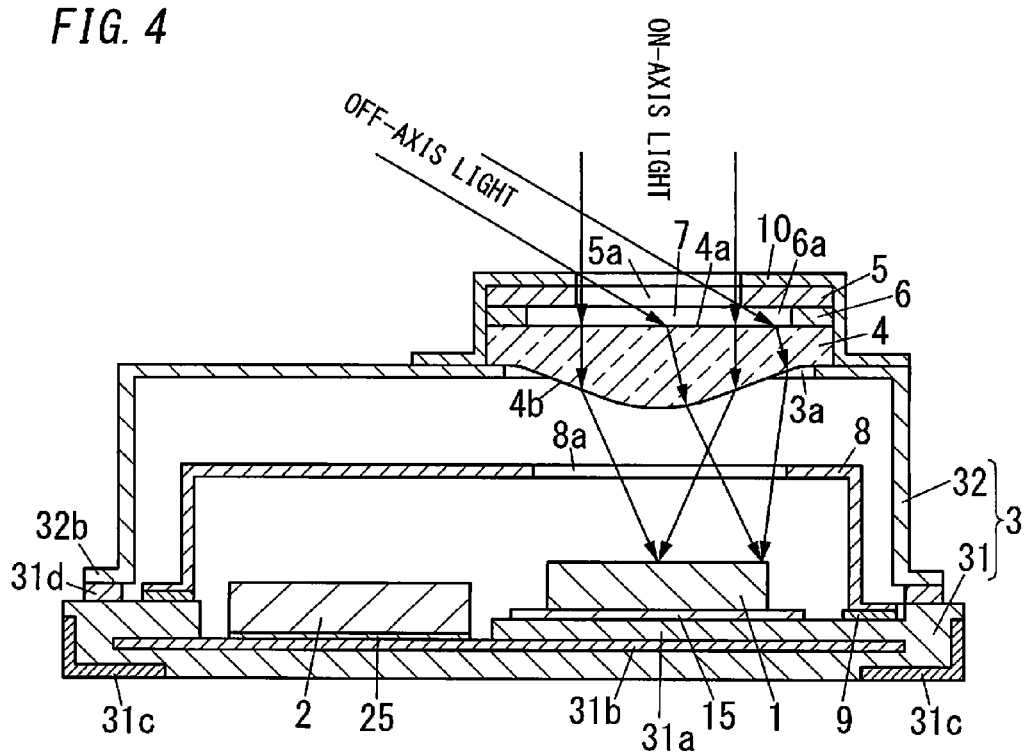

INFRARED SENSOR

CROSS REFERENCE TO RELATED APPLICATIONS

This application is a continuation application of International Application No. PCT/JP2012/079808, filed on Nov. 16, 2012, entitled "INFRARED SENSOR", which claims priority based on Article 8 of Patent Cooperation Treaty from prior Japanese Patent Application No. 2011-273619, filed on Dec. 14, 2011, the entire contents of which are incorporated herein by reference.

TECHNICAL FIELD

The disclosure relates to an infrared sensor.

BACKGROUND ART

Conventionally, there is known an infrared sensor that includes an infrared detecting device, a package housing the infrared detecting device, and a semiconductor lens closing a window hole, in front of the infrared detecting device, of the package (e.g., JP Pub. Nos. 2011-220939 (Patent Document 1), 2007-292721 (Patent Document 2) and 2010-237117 (Patent Document 3)).

In the infrared sensor, there is a concern about degradation in detection precision because an off-axis aberration occurs in a case where infrared (an off-axis light) emitted from an off-axis object point is detected.

SUMMARY OF THE INVENTION

The present invention has been achieved in view of the above circumstances, and an object thereof is to provide an infrared sensor capable of suppressing the occurrence of an off-axis aberration of an lens.

According to one aspect of the present invention, an infrared sensor includes an infrared detecting device, a lens, a member and a gap. The lens is disposed above the infrared detecting device. The member is disposed on an upper surface of the lens, and includes an opening. The gap is disposed between the member and the lens and has a wider range than the opening.

BRIEF DESCRIPTION OF THE DRAWINGS

The figures depict one or more implementations in accordance with the present teaching, by way of example only, not bay way of limitations. In the figure, like reference numerals refer to the same or similar elements where:

FIG. 3 is a view illustrating another configuration example of a member of the infrared sensor in the embodiment;

FIG. 4 is a schematic sectional view of an infrared sensor in an embodiment;

DETAILED DESCRIPTION

Figure 1:
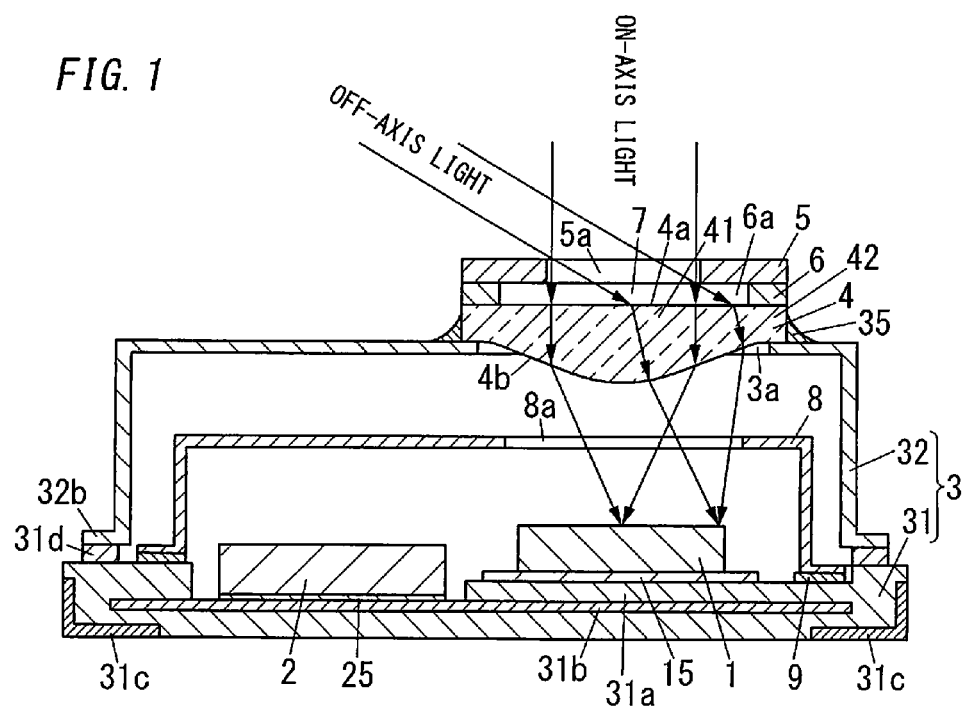
FIG. 1 is a schematic sectional view of an infrared sensor in an embodiment.

Hereinafter, an infrared sensor in an embodiment is explained with reference to FIG. 1.

The infrared sensor includes an infrared detecting device 1, a package 3 housing the infrared detecting device 1, and a lens 4 that is disposed so as to close a window hole 3a, above the infrared detecting device 1, of the package 3. That is, in the infrared sensor, the package 3 includes the window hole 3a above the infrared detecting device 1, and the lens 4 is disposed so as to close the window hole 3a. The infrared sensor also includes: a member 5 that is disposed at a side of an upper surface 4a of the lens 4 and includes an opening 5a defining an infrared transmission region in the lens 4; and a spacer 6 that intervenes between the member 5 and the lens 4.

The package 3 includes a package body 31 on which the infrared detecting device 1 is mounted, and a package lid 32 joined to the package body 31. The package lid 32 of the package 3 is formed with the aforementioned window hole 3a. The lens 4 is joined to the package lid 32 through a junction member 35. In the infrared sensor, the whole periphery of the lens 4 is joined to part, all around the window hole 3a, of the package lid 32. In the infrared sensor, an interior space (an airtight space) surrounded by the package 3 and the lens 4 is maintained under a dry nitrogen atmosphere, but not limited to this. For example, it may be maintained under a vacuum atmosphere. In a case where the interior space of the package 3 in the infrared sensor is maintained under a vacuum atmosphere, it is preferable that a getter for absorbing residual gas and the like within the package 3 be provided on an inside of the package lid 32. Preferably, material of the getter is, for example, a nonevaporative getter of which activation temperature is about 300 to 350° C. For example, a nonevaporative getter such as zirconium alloy, titanium alloy or the like may be employed.

The infrared sensor includes an IC device 2 configured to perform signal processing of an output signal from the infrared detecting device 1, and the IC device 2 is also housed in the package 3. In the infrared sensor, the infrared detecting device 1 and the IC device 2 are arranged side by side in a lateral direction within the package 3. That is, the infrared detecting device 1 and the IC device 2 in the infrared sensor are arranged side by side in the lateral direction on a first surface side (an upper surface side in FIG. 1) of the package body 31. However, the package 3 is not limited to the structure in which the IC device 2 and the infrared detecting device 1 are housed therein side by side in the lateral direction. For example, the IC device 2 and the infrared detecting device 1 may be housed in the package side by side in a vertical direction.

In the package body 31, a wiring pattern (not shown) that electrically connects the infrared detecting device 1, the IC device 2 and the like is formed on a substrate 31a formed of insulating material. Respective pads of the infrared detecting device 1 and the IC device 2 are connected to the wiring pattern through wires (not shown). It is not necessarily required that the IC device 2 is mounted with face up. For example, the IC device 2 may be mounted with face down. In this case, the pads of the IC device 2 can be connected to the wiring pattern with bumps. Also, in the infrared detecting device 1, by providing through-hole wirings for the infrared detecting device 1, the through-hole wirings may be connected to the wiring pattern through bumps or the like. The package body 31 is formed with an electromagnetic shielding layer 31*b*, thereby functioning as an electromagnetic shield. On the other hand, the package lid 32 has electrical conductivity as described later. The package lid 32 is electrically connected to the electromagnetic shielding layer 31*b* of the package body 31. The lens 4 is made of silicon. Therefore, in the infrared sensor, the electromagnetic shielding layer 31*b* of the package body 31, the package lid 32 and the lens 4 can have identical potential. As a result, the infrared sensor has a function for shielding, from external electromagnetic noise, a sensor circuit (not shown) including the infrared detecting device 1, the IC device 2, the wiring pattern and the like.

In the infrared sensor of the embodiment, ceramics is employed as the insulating material of the substrate 31*a* of the package body 31. According to the infrared sensor, it is possible to improve moisture resistance and thermal resistance of the package body 31 in comparison with a case where organic material such as epoxy resin is employed as insulating material. In the infrared sensor, if alumina is employed as the ceramics of the insulating material, thermal conductivity of the insulating material in the infrared sensor can be reduced in comparison with aluminum nitride, silicon carbide and the like. As a result, in the infrared sensor, it is possible to suppress reduction in sensitivity of the infrared detecting device 1, caused by heat from the IC device 2 and an outside of the package 3.

In the package body 31, external connection electrodes 31*c* electrically connected to the sensor circuit are formed from a second surface (a lower surface in FIG. 1) to an outer periphery of the substrate 31*a*.

The infrared detecting device 1 is joined to the package body 31 through a junction member 15 formed of a first die bond agent (e.g., silicone resin). The IC device 2 is mounted on the package body 31 through a junction member 25 formed of a second die bond agent (e.g., silicone resin). Examples of each die bond agent include insulating adhesive such as low-melting glass, epoxy resin and silicone resin, and conductive adhesive such as solder (lead-free solder, gold-tin solder, etc.) and silver paste. Alternatively, the infrared detecting device 1 and the IC device 2 may be joined to the package body 31 by, for example, room temperature bonding, or eutectic bonding with gold-tin eutectic, without using the die bond agents.

In the package body 31, regions of the wiring pattern connected with ground pads (not shown) of the infrared detecting device 1 and the IC device 2 are electrically connected to the electromagnetic shielding layer 31*b*. Accordingly, in the infrared sensor, it is possible to reduce an influence of external electromagnetic noise onto the sensor circuit formed of the infrared detecting device 1, the IC device 2 and the like, and to reduce reduction in S/N ratio caused by the external electromagnetic noise.

The package lid 32 is, e.g., a metal cap shaped like a box with an opening at a face thereof on a side of the package body 31. The package lid 32 is joined to the package body 31 so that the face of the package lid is closed and sealed with the package body 31. The whole periphery of the first surface of the package body 31 is formed with a metal pattern 31*d* shaped like a frame along an outer periphery of the substrate 31*a* in the package body 31. The package lid 32 and the metal pattern 31*d* of the package body 31 are joined by metal junction of seam welding (resistance welding process), thereby enhancing air tightness and electromagnetic shield effect. The package lid 32 is made of Kovar and plated with nickel. The metal pattern 31*d* of the package body 31 is made of Kovar and plated with nickel and further plated with gold.

Joining of the package lid 32 and the metal pattern 31*d* of the package body 31 may be other welding (e.g., spot welding) or joined by conductive resin, and is not limited to the seam welding. If aerotropic conductive adhesive is employed as conductive resin, it is possible to suppress intrusion of external moisture and gas (e.g., moisture, oxygen and the like) into the package 3 because resin (binder) contains a low content of conductive particles dispersed therein and a thickness of junction of the package lid 32 and the package body 31 can be thinned by applying heat and pressure when joining them. Mixture containing desiccant may be employed as the conductive resin. For example, barium oxide, calcium oxide or the like can be employed as the desiccant.

Each outer periphery of the package body 31 and the package lid 32 is shaped like a rectangle, but not limited to the rectangle. For example, it may be shaped like a circle. The package lid 32 includes a brim 32*b* protruded outward from the whole periphery of end edges of the package body 31, and the whole periphery of the brim 32*b* is joined to the package body 31.

The package body 31 may be formed of a printed wiring board which an electromagnetic shield plate is embedded in. In this case, it is preferable that a periphery of the package body 31 formed of the printed wiring board and the package lid 32 be joined and sealed with a junction member formed of conductive resin containing desiccant, B-stage epoxy resin having electrical conductivity or the like. For example, barium oxide, calcium oxide or the like may be employed as the desiccant.

Each shape of the package body 31 and the package lid 32 in the package 3 is not limited to the aforementioned examples. As an example of the package 3, the package body 31 may be shaped like a box having an opening at a first surface thereof (a rectangular box in this example), while the package lid 32 having the window hole 3*a* may be shaped like a flat plate joined to the package body 31 so that the first surface of the package body 31 is closed and sealed. For example, the package 3 may be a can package disclosed in Patent Document 2, but the structure of the can package is not limited to the structure of Patent Document 2. For example, in a case where the package 3 is the can package disclosed in Patent Document 2, a stem, a cap and a light transmitting window described in Patent Document 2 correspond to the package body 31, package lid 32 and the window hole, respectively.

An infrared sensor chip formed by a micromachining technique may be employed as the infrared detecting device 1. For example, the infrared sensor chip may include a support substrate 1*a* formed of a semiconductor substrate, and pixels 1*b* (see FIG. 2A) arranged in array (e.g., two-dimensional array) on a first surface of the support substrate, where each pixel includes a thermal infrared detector and a MOS transistor as a switching device for pixel selection. For example, an infrared array sensor disclosed in JP Pub. No. 2010-237117 may be employed as the infrared sensor chip. In this infrared array sensor, a temperature sensing element of the thermal infrared detector is formed of a thermopile, and has a hot junction and a cold junction. In the infrared sensor of the embodiment, it is preferable that the package 3 is provided therein with a cover member 8 for equalizing temperature change values of a hot junction and a cold junction of each pixel 1*b* in response to heat generation of the IC device 2. The cover member 8 includes, above the infrared detecting device 1, an opening window 8a that allows infrared toward the infrared detecting device 1 to pass therethrough. An outer periphery of the infrared detecting device 1 is shaped like a rectangle, and the opening window 8a is an opening shaped like a rectangle. The opening of the opening window 8a is shaped so as to be a similar figure to the outer periphery of the infrared detecting device 1, but is not necessarily a similar figure.

Material of the cover member 8 is Kovar, but not limited to this. For example, stainless steel, copper, aluminum or the like may be employed.

The cover member 8 is joined to the package body 31 through a junction member 9. Examples of material of the junction member 9 include electrically conductive paste (e.g., silver paste and the like), epoxy resin and the like.

In the infrared sensor of the embodiment, the cover member 8 is provided in the package 3 and it is accordingly possible to equalize heat to propagate toward the pixels 1B because heat caused by heat generation of the IC device 2 is to propagate toward the pixels 1B of the infrared sensor chip as the infrared detecting device 1 by way of a path passing through the package body 31 and a path passing through the cover member 8. As a result, the infrared detecting device can suppress the dispersion of offset voltages in a surface of the infrared sensor chip caused by heat generation of the IC device 2 and suppress the dispersion of S/N ratio. In the infrared sensor, it is therefore possible to reduce a difference between an offset voltage of a temperature sensing element in each pixel 1b (a pixel 1b on left end of FIG. 2A) of the infrared sensor chip, nearest to the IC device 2 and an offset voltage of a temperature sensing element in each pixel 1b (a pixel 1b on right end of FIG. 2A) farthest from the IC device 2.

Since the cover member 8 is provided in the package 3, the infrared sensor can prevent infrared radiation from the IC device 2 caused by heat generation of the IC device 2 and infrared radiation from the package lid 32 from directly reaching the infrared detecting device 1.

The infrared sensor chip as the infrared detecting device 1 is not limited to the structure disclosed in the aforementioned document. It may have a configuration that thermal infrared detectors are arranged in array on the first surface side of the support substrate 1a. A temperature sensing element of each thermal infrared detector is formed of a thermopile, but not limited to the thermopile. It may be formed of, for example, a resistance bolometer, a pyroelectric thin film or the like. In a case where each temperature sensing element of the infrared sensor chip as the infrared detecting device 1 is formed of a thermopile, it is preferable that the infrared sensor be configured so that a thermistor for measuring an absolute temperature is also housed in the package 3.

In the infrared sensor chip as the infrared detecting device 1, a MOS transistor is provided for each pixel 1b, but is not necessarily provided. In addition, the infrared detecting device 1 may include at least one temperature sensing element, and is not necessarily the infrared sensor chip including the pixels 1b arranged in array. The infrared detecting device 1 may be pyroelectric element formed of a pyroelectric substrate. In this case, in secondary mounting of the infrared sensor on a circuit board such as a printed wiring board or the like, it is preferable to employ lithium tantalate (LiTaO$_3$) or lithium niobate (LiNbO$_3$) of each of which Curie temperature is higher than that of lead zirconate titanate (Pb(Zr,Ti)O$_3$:PZT) as material of a pyroelectric element in consideration with the usage of lead-free solder (e.g., SnCuAg solder or the like) as joining material. Examples of the pyroelectric element include a quad type element in which four elements (a light receiving element) are formed on a single pyroelectric substrate in two-by-two or linear array, a dual type element in which two elements are formed thereon in linear array, and the like. It is accordingly possible to reduce output fluctuation of the pyroelectric element, caused by heat from an outside. The pyroelectric element is not limited to the quad type element and the dual type element. For example, a single type element may be employed.

The IC device 2 is an ASIC (Application Specific IC) and includes a silicon substrate. The IC device 2 is not limited to the ASIC. An IC including specified integrated signal processing circuit may be employed. A bare chip is also employed as the IC device 2. Therefore, in the infrared sensor of the embodiment, the package 3 can be miniaturized in comparison with an IC device 2 formed by packaging a bare chip.

Preferably, the circuit of the IC device 2 is appropriately designed in response to a kind of the infrared detecting device 1. For example, in a case where the infrared detecting device 1 is the aforementioned infrared sensor chip, the circuit may be configured to include a control circuit configured to control the infrared detecting device 1, an amplifier circuit configured to amplify an output voltage of the infrared detecting device 1, and a multiplexer configured to alternatively provide the amplifier circuit with output voltages of input pads electrically connected to output pads of the infrared detecting device 1. According to the circuit, an infrared image can be obtained. In this example, the IC device 2 includes an arithmetic circuit configured to obtain a temperature based on an output of the amplifier circuit (an output in response to a difference in temperature between a hot junction and a cold junction of a pixel 1b) and an output of the thermistor (an output in response to an absolute temperature, which is regarded as an output in response to a temperature of a cold junction of a pixel 1b). In the device, an infrared image can be displayed on an external display. In a case where the infrared sensor functions as a human sensor and includes the aforementioned pyroelectric element as the infrared detecting device 1, a circuit of the IC device 2 may be configured to include a current/voltage conversion circuit configured to convert a pyroelectric current as an output signal from the infrared detecting device 1 into a voltage signal, a voltage amplifying circuit (a band pass amplifier) configured to amplify a voltage signal having a specified frequency band of a voltage signal from the current/voltage conversion circuit, a detection circuit configured to compare the voltage signal from the voltage amplifying circuit with a specified threshold to output a detection signal when the voltage signal exceeds the threshold, and an output circuit configured to output the detection signal of the detection circuit as a human body detection signal.

Infrared assumed in the infrared sensor of the embodiment contains a wavelength range (8 μm to 13 μm) around 10 μm radiated from a human body as the infrared that is a detection target of the infrared detecting device 1. Accordingly, silicon is employed as material of the lens 4. However, the material of the lens 4 is not limited to silicon. For example, germanium, zinc sulfide, gallium arsenide or the like may be employed. Preferably, silicon is employed because it provides a low environmental load in comparison with zinc sulfide, gallium arsenide and the like, reduction in cost in comparison with germanium, and low wavelength dispersion in comparison with zinc sulfide. A wavelength range or a wavelength of the infrared as the detection target is not limited to the aforementioned wavelength range. It may be appropriately set according to the practical use of the infrared sensor (e.g., the use of human detection, the use of gas detection or flame detection, or the like).

It is preferable that an optical filter film be provided on at least one of a side of the upper surface (an incoming surface for infrared) 4a and a side of a lower surface (an outgoing surface for infrared) 4b of the lens 4. Preferably, an optical property of the optical filter film (a filter property) is set based on a wavelength range or a wavelength of the infrared as the detection target by the infrared detecting device 1.

In the infrared sensor of the embodiment, a wavelength range of the infrared assumed as the detection target is 8 μm to 13 μm, and the optical property of the optical filter film is optically designed so that the infrared having a wavelength range of 5 μm to 15 μm passes therethrough. However, it is preferable that the optical design be appropriately performed in response to a wavelength range or a wavelength of the infrared as the detection target according to the practical use of the infrared sensor.

For example, the optical filter film may be formed by alternately stacking thin films of which refractive indexes are different from each other. Examples of material of each thin film include germanium, zinc sulfide, selenium sulfide, alumina, silicon oxide, silicon nitride, magnesium fluoride and the like.

In the infrared sensor, the lens 4 is appropriately provided with the optical filter film, thereby enabling removal of a visible light and an infrared light in an unnecessary range other than a specified wavelength region and the suppression of an occurrence of noise caused by sunlight and the like. It is accordingly possible to enhance the sensitivity.

In a case where the optical filter film is provided for each side of the upper surface 4a and the lower surface 4b of the lens 4, optical properties of the two optical filter films may be the same as or different from each other. For example, the lens 4 may be optically designed so that the optical filter film on the side of the upper surface 4a removes infrared of 2 μm to 5 μm and the optical filter film on the side of the lower surface 4b removes infrared of 2 μm or less. The lens 4 may be configured so that one of the side of the upper surface 4a and the side of the lower surface 4b is provided with the optical filter film and the other is provided with an antireflection film for preventing infrared reflection. The antireflection film may be appropriately designed to have laminate structure by using material similar to the optical filter film.

An optical film of the aforementioned optical filter film or the antireflection film may be formed by forming a film by using a thin film forming technology such as an evaporation method or a sputtering method to then apply patterning by using a photolithography technique and an etching technique or patterning by a laser beam or patterning by using a dicing saw. When forming the optical film by using the thin film forming technology such as the evaporation method or the sputtering method, the optical film may be formed only in a specified region by arranging an appropriate shadow mask. As a result, it is possible to omit a patterning process for the optical film after forming the optical film.

For example, solder or the like may be employed as material of the junction member 35 that joins the lens 4 and the package lid 32. In a case where solder is employed as the material of the junction member 35, it is preferable that a metallization film (a metal film) made of metallic material having good wettability with the solder at a region, corresponding to the junction member 35, of the lens 4. For example, the junction member 35 may be formed of a first region made of low-melting glass and a second region made of electrically conductive paste. Preferably, lead-free low-melting glass may be employed as the aforementioned low-melting glass. Silver paste is employed as the electrically conductive paste, but is not limited to this. The electrically conductive paste is formed of conductive filler and binder. Examples of the conductive filler include silver, gold, copper, nickel, aluminum, carbon, graphite and the like. Examples of the binder include epoxy resin, urethane, silicone, acrylic, polyimide and the like. In a case where the junction member 35 of the infrared sensor is formed of the first region and the second region, if low-melting glass is used for material of the first region inside the second region, it is possible to decrease outgas within the package 3 from the junction member 35 and to prevent deterioration in characteristics and reduction in production yield caused by the outgas.

Preferably, aspherical lens like plano-convex lens is employed as the lens 4. In an arrangement of the infrared sensor of the embodiment, a first surface, shaped like a plane, of the lens 4 is the upper surface 4a, and a second surface, shaped like a convex surface, of the lens 4 is the lower surface 4b. In the infrared sensor of the embodiment, a detection area of the infrared detecting device 1 can be set by the lens 4 and the member 5.

Preferably, the lens 4 is formed of a semiconductor lens (e.g., a silicon lens or the like). In a manufacturing example of the semiconductor lens, a semiconductor substrate (e.g., a silicon substrate or the like) is prepared. An anode by designing a contact pattern with the semiconductor substrate in accordance with a shape of a desired lens is then formed on a first surface side of the semiconductor substrate so as to form ohmic contact as contact with the semiconductor substrate. A second surface side of the semiconductor substrate is anodized in an electrolytic solution containing a solution for removing, by etching, oxide of constituent element of the semiconductor substrate, thereby forming a porous region to be removed. The porous region is then removed, so that a semiconductor lens is formed. For example, production methods for semiconductor lens disclosed in JP Pub. Nos. 3897055, 3897056 and the like can be applied as the above sort of production method for semiconductor lens based on anodic oxidation technology. In the lens 4 formed of the aforementioned semiconductor lens, it is preferable that numerous lenses 4 be formed by employing a semiconductor wafer (e.g., a silicon wafer) as the semiconductor substrate and then separated individually by dicing or the like.

In the infrared sensor of the embodiment, an aspherical lens formed of the semiconductor lens is employed as the lens 4, and it is accordingly possible to obtain small aberration in comparison with a spherical lens formed by cutting work even in a lens 4 that has a short focus and a large opening size. Thus, the focus is shortened, and thereby the package 3 can be thinned. In the infrared sensor of the embodiment, the second surface, shaped like the convex surface, of the lens 4 is disposed at a side of the window hole 3a of the package lid 32 and part of the lens 4 can be housed in the window hole 3a. As a result, the package 3 can be further thinned.

Preferably, the lens 4 is a semiconductor lens integrally formed of a lens portion 41 and a flange portion 42 surrounding the whole periphery of the lens portion 41. As a result, in the infrared sensor, the spacer 6 interposed between the lens 4 and the member 5 can be interposed between the flange portion 42 of the lens 4 and a periphery of the opening 5a in the member 5. Therefore, in the infrared sensor, it is possible to enhance parallelism of the member 5 with respect to the first surface of the lens 4 and to improve optical-axis alignment between the member 5 and the lens 4. The infrared sensor includes the flange portion 42 which has a constant thickness, and each face of the flange portion 42 on both sides of a thickness direction is shaped like a plane. As a result, it is possible to enhance precision of a distance between the lens 4 and the infrared detecting device 1 in an optical axis direction of the lens 4.

The lens 4 may include a level difference which is formed along the whole periphery of the flange portion 42 and positioned at part, around the window hole 3a, of the package lid 32 and an inside of the window hole 3a. In this case, it is preferable that the level difference of the lens 4 is joined to part, all around the window hole 3a, of the package lid 32 through the junction member 35. Thus, if the level difference is provided, it is possible to enhance parallelism between the lens 4 and the infrared detecting device 1, and precision of the distance between the lens 4 and the infrared detecting device 1 in the optical axis direction of the lens 4. For example, the level difference may be formed by using a dicing blade or the like at a stage of the silicon wafer before separation, or formed by a photolithography technique or an etching technique before a dicing process.

An outer periphery of the member 5 is shaped like a rectangle that is the same as an outer periphery of the lens 4. The opening 5a of the member 5 is shaped like a circle. The opening 5a of the member 5 has an internal diameter that is set smaller than a lens diameter of the lens 4. It is preferable that the member 5 is disposed so that the optical axis of the member 5 agrees with the optical axis of the lens 4.

Examples of material of the member 5 include silicon, glass and the like. In a case where silicon or glass is employed as the material of the member 5, the member 5 may include a metal film or the like as a light shielding film for shielding infrared at an opposite side of a member substrate from the lens 4, where the member substrate is formed of silicon, glass or the like. Examples of material of the metal film include gold, chromium, nickel, titanium and the like. The metal film may be formed by forming a film by using a thin film forming technology such as an evaporation method or a sputtering method to then apply patterning by using a photolithography technique and an etching technique. When forming the metal film by using the thin film forming technology such as the evaporation method or the sputtering method, the metal film may be formed only in a specified region by arranging an appropriate shadow mask. As a result, it is possible to omit a patterning process for the metal film after forming the metal film.

In a formation process of the member 5, numerous members 5 may be formed on a wafer (hereinafter called a first wafer) formed of silicon, glass or the like and then separated individually by dicing or the like. In a case where silicon is employed as material of the first wafer, the opening 5a of the member 5 may be formed by, for example, etching such as wet etching in which an alkali solution that is a TMAH (tetra-methyl ammonium hydroxide) solution or the like is used, or dry etching in which dry etching apparatus that is a type of inductively coupled plasma or the like is used. In a case where an area of the opening 5a of the member 5 is constant regardless of a distance from the lens 4, by using a silicon wafer with a main surface of (110) plane as the first wafer, it is possible to form the opening 5a even by the wet etching in which the alkali solution is used. The dry etching apparatus is not limited to the type of inductively coupled plasma. It may be a dry etching apparatus which has a comparatively high etching rate with respect to the first wafer and of which control of an opening shape of the opening 5a is comparatively simple. In a case where glass is employed as the material of the first wafer, the opening 5a of the member 5 may be formed by, for example, blast processing or the like.

Examples of material of the spacer 6 include silicon, glass and the like.

The spacer 6 is shaped like a frame. In the embodiment, an outer periphery of the spacer 6 in planar view is shaped like a rectangle that is the same as the outer periphery of the lens 4, and an inner periphery thereof in planar view is shaped like a circle that is larger in internal diameter than an inside of the opening 5a of the member 5. As a result, the infrared sensor of the embodiment includes a gap 7 that intervenes between the member 5 and the lens 4 and is formed in a wider range than the opening 5a of the member 5. In the infrared sensor of the embodiment, the gap 7 is formed of a hollow space that is shaped like a cylinder and surrounded by the member 5, the lens 4 and the spacer 6.

In a formation process of the spacer 6, it is preferable that numerous spacers 6 may be formed on a wafer (hereinafter called a second wafer) formed of silicon or glass and then separated into individual spacers 6 by dicing or the like. In a case where silicon is employed as material of the second wafer, the opening 6a of the spacer 6 may be formed by, for example, etching such as wet etching in which an alkali solution that is a TMAH solution or the like is used, or dry etching in which dry etching apparatus that is a type of inductively coupled plasma or the like is used. In a case where an area of the opening 6a of the spacer 6 is constant regardless of a distance from the lens 4, by using a silicon wafer with a main surface of (110) plane as the second wafer, it is possible to form the opening 6a even by the wet etching in which the alkali solution is used. The dry etching apparatus is not limited to the type of inductively coupled plasma. It may be a dry etching apparatus which has a comparatively high etching rate with respect to the second wafer and of which control of an opening shape of the opening 6a is comparatively simple. In a case where glass is employed as the material of the second wafer, the opening 6a of the spacer 6 may be formed by, for example, blast processing or the like.

Preferably, individual optical members each of which integrally includes the spacer 6, lens 4 and the member 5 are obtained by dicing wafer-level structure in which the second wafer, the semiconductor wafer and the first wafer are joined at wafer-level so that each spacer 6 is joined to corresponding lens 4 and member 5 at wafer-level. The second wafer is formed with the numerous spacers 6. The semiconductor wafer is formed with the numerous lenses 4. The first wafer is formed with the numerous members 5. Examples of the joining method include a method in which gold to gold diffusion bonding is performed by previously forming a gold film on each of surfaces to be joined each other, a method in which gold to tin diffusion bonding is performed by previously forming a gold film and a tin film on one and other of surfaces to be joined each other, respectively, and the surface-activated bonding method.

In the infrared sensor of the embodiment, it is preferable that the lens 4, the spacer 6 and the member 5 are formed integrally as mentioned above. As a result, it is possible to enhance precision of relative positions among the lens 4, the spacer 6 and the member 5.

Figure 2A:
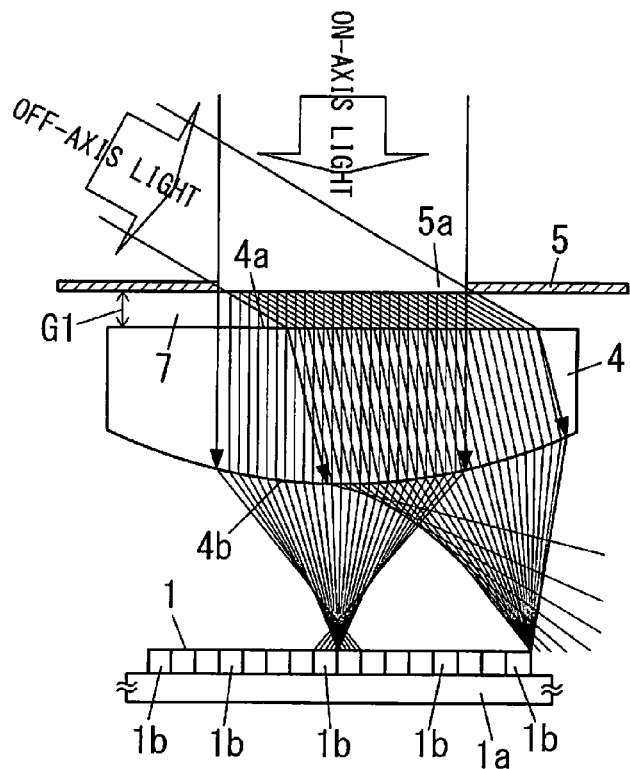
FIG. 2A is a view illustrating propagation paths of infrared incident on the infrared sensor in the embodiment.
Figure 2B:
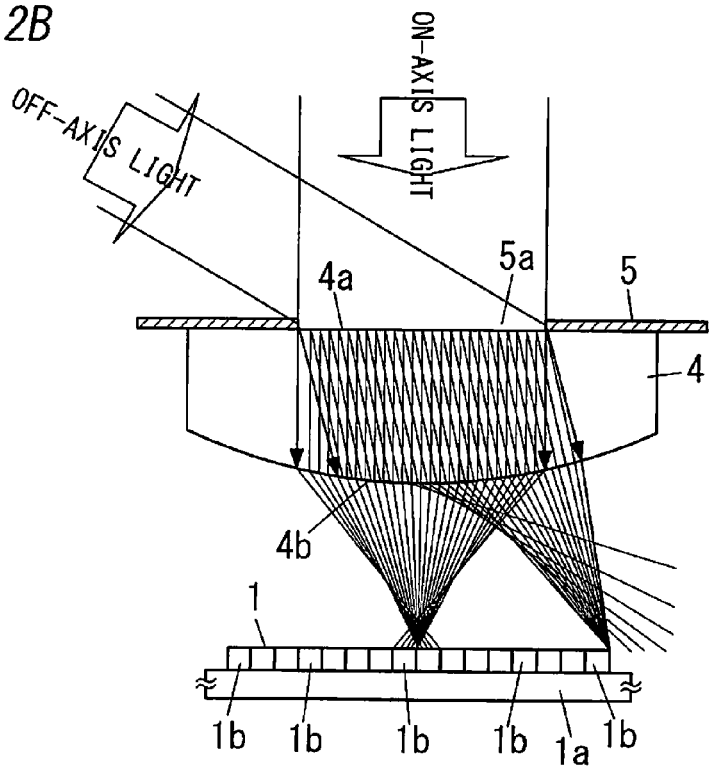
FIG. 2B is a view illustrating propagation paths of infrared incident on an infrared sensor in a comparative example.

FIG. 2A shows propagation paths of an infrared light (an on-axis light and an off-axis light) that is infrared incident on the upper surface 4a of the lens 4 in a case where a distance G1 between the upper surface 4a and the member 5 of the lens 4 in the optical axis direction of the lens 4 in the infrared sensor of the embodiment is set to 0.25 mm. FIG. 2B shows propagation paths of an infrared light (an on-axis light and an off-axis light) that is infrared incident on an upper surface 4a of a lens 4 in an infrared sensor which has a similar configuration to the infrared sensor that the upper surface 4a of the lens 4 is in contact with the member 5 not through a spacer 6. Propagation paths of infrared in each of FIGS. 2A and 2B were obtained by a simulation based on a ray tracing method.

The example shown in FIG. 2B has a large incident angle onto the upper surface 4a and large off-axis aberration in a case where an incident angle of infrared from a heat source (not shown) is large. As a result, a resolution with respect to an off-axis light (an off-axis incident light) from the heat source as an off-axis object point becomes low, thereby causing reduction in S/N ratio at pixels 1b far from a center of an infrared detecting device 1 in a case where the infrared detecting device 1 is an infrared sensor chip in which the pixels 1b are arranged in array as mentioned above. In the infrared sensor of the embodiment, the spacer 6 is provided between the lens 4 and the member 5 as shown in FIG. 2A, thereby being capable of shifting an infrared transmission region for an off-axis light incident on the upper surface 4a of the lens 4 from a center to a periphery side of the lens 4, and decreasing an incident angle onto the lower surface 4b of the lens 4. As a result, it is possible to improve a resolution for the off-axis light.

In the infrared sensor of the embodiment shown in FIG. 2A, it has been confirmed that off-axis aberration thereof is small in comparison with the infrared sensor of the example shown in FIG. 2B.

In the infrared sensor of the embodiment, a thickness of the spacer 6 is set to 0.25 mm, but the numerical value is just an example and not limited thereto. For example, the thickness of the spacer 6 may be less than 0.25 mm. It may be suitably designed in accordance with a lens diameter, a back focus and the like of the lens 4.

The infrared sensor of the embodiment includes the infrared detecting device 1, the package 3 and the lens 4 as mentioned above, and further includes the member 5 that is disposed at the side of the upper surface 4a of the lens 4 and includes the opening 5a defining the infrared transmission region in the lens 4, and the spacer 6 that intervenes between the member 5 and the lens 4. As a result, in the infrared sensor of the embodiment, it is possible to suppress the occurrence of an off-axis aberration of the lens 4. In this embodiment, the infrared sensor includes the gap 7 between the lens 4 and the member 5, thereby being capable of shifting an infrared transmission region with respect to an off-axis light incident on the upper surface 4a of the lens 4 from the center to the periphery side of the lens 4, and decreasing an incident angle onto the surface 4b of the lens 4. As a result, it is possible to improve a resolution for the off-axis light. In short, the infrared sensor of the embodiment includes the gap 7 between the lens 4 and the member 5, thereby being capable of suppressing the occurrence of an off-axis aberration of the lens 4.

As shown in FIG. 3, the infrared sensor may include an member 5 in which an opening 5a is an inversely tapered opening of which area gradually increases in a direction apart from the lens 4. In this infrared sensor, it is possible to prevent an off-axis light from being blocked with the member 5, and to prevent the provided member 5 from narrowing a detection area and decreasing sensitivity of each pixel 1b at the periphery of the infrared detecting device 1. This sort of opening 5a of the member 5 can be formed by wet etching in which an alkali solution is used if a silicon wafer with a main surface of (100) surface is employed as the first wafer. In this case, a taper angle of an inside of the opening 5a is approximately 54.7°. In addition, the opening 5a of the member 5 can be formed by using dry etching apparatus and properly setting an etching condition thereof. If the opening 5a of the member 5 is formed by using a photolithography technique and an etching technique along with a gray scale mask, design freedom of each of a shape of the opening 5a and the taper angle can be enhanced.

Preferably, the taper angle of the inside of the opening 5a in the member 5 is equal to or less than a value obtained by subtracting, from 90°, an angle that is half the size of a specified view angle. The specified view angle is a view angle of the infrared sensor. When the specified view angle is 60°, the taper angle is preferably equal to or less than 60°. When the specified view angle is 120°, the taper angle is preferably equal to or less than 30°.

Preferably, the taper angle of the inside of the opening 5a in the member 5 is more than 0°. From view of miniaturizing the member 5 in plane size and mechanical strength of the member 5, it is preferable that the angle be larger than a value obtained by subtracting a total reflection angle of the upper surface 4a from 90°.

Hereinafter, an infrared sensor of an embodiment is explained with reference to FIG. 4.

The infrared sensor of the embodiment differs from the embodiment of FIG. 1 in that the infrared sensor of the embodiment includes a protection portion 10 that is disposed outside the package 3 and configured to protect the member 5. Like kind elements are assigned the same reference numerals as depicted in the embodiment of FIG. 1, and explanation thereof is omitted.

For example, resin such as epoxy resin, silicone resin, polyimide or the like may be employed as material of the protection portion 10.

The infrared sensor of the embodiment includes the protection portion 10 for protecting the member 5, and it is accordingly possible to prevent the member 5 from being damaged.

Preferably, the protection portion 10 is formed on an opposite surface of the member 5 from the lens 4 along with an outer edge of the member 5, an outer edge of the spacer 6, an outer periphery of the lens 4, and part, around the lens 4, of the package lid 32. As a result, the infrared sensor can protect not only the member 5 but also the spacer 6 and the lens 4, thereby improving reliability thereof.

In the infrared sensor of the embodiment, the opening 5a of the member 5 is formed like the configuration of FIG. 1 as described in the embodiment of FIG. 1, but may be formed like the opening 5a of the member 5 as shown in FIG. 3.

Figure 5:
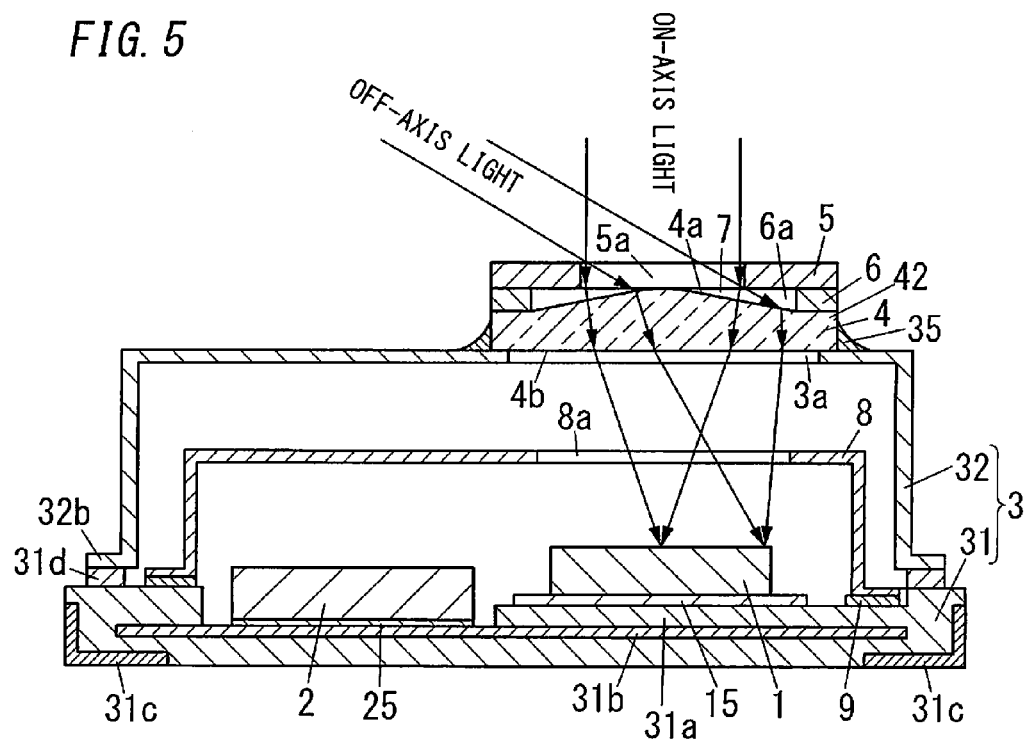
FIG. 5 is a schematic sectional view of an infrared sensor in an embodiment.

Hereinafter, an infrared sensor of an embodiment is explained with reference to FIG. 5.

The infrared sensor of the embodiment differs from the embodiment of FIG. 1 in that the infrared sensor of the embodiment has a second surface, shaped like a convex surface, of a lens 4 as an upper surface 4a and a first surface, shaped like a plane, thereof as an lower surface 4b. That is, the lens 4 in the infrared sensor of the embodiment is the reverse of that in the embodiment of FIG. 1. Like kind elements are assigned the same reference numerals as depicted in the embodiment of FIG. 1, and explanation thereof is omitted.

The infrared sensor of the embodiment includes an infrared detecting device 1, a package 3 and a lens 4 like the infrared sensor of the embodiment of FIG. 1, and further includes an member 5 that is disposed at a side of the upper surface 4a of the lens 4 and includes an opening 5a defining an infrared transmission region in the lens 4, and a spacer 6 that intervenes between the member 5 and the lens 4. The infrared sensor of the embodiment includes a gap 7 that intervenes between the member 5 and the lens 4 and has a wider range than the opening 5a. It is accordingly possible to suppress the occurrence of an off-axis aberration of the lens 4.

In the infrared sensor of the embodiment, the opening 5a of the member 5 is formed like the configuration of FIG. 1 as described in the embodiment of FIG. 1, but may be formed like the opening 5a of the member 5 as shown in FIG. 3. The infrared sensor of the embodiment may be provided with a protection portion 10 as explained in the embodiment of FIG. 4.

In each of the aforementioned embodiments, a lens 4 is disposed on an outside of a package lid 32, but is not limited to this. The lens 4 may be disposed on an inside of the package lid 32.

Hereinafter, an infrared sensor of an embodiment is explained with reference to FIG. 6.

The infrared sensor of the embodiment differs from the embodiment of FIG. 1 mainly in that the infrared sensor of the embodiment includes a lens 4 that is disposed so as to close a window hole 3a of a package 3 from an inside of the package 3, and part of the package 3 doubles as an member 5. The member 5 includes the window hole 3a as an opening 5a. That is, the window hole 3a doubles as the opening 5a. Like kind elements are assigned the same reference numerals as depicted in the embodiment of FIG. 1, and explanation thereof is omitted.

A spacer 6 in the infrared sensor of the embodiment is disposed between the member 5 and the lens 4 on the inside of the package 3. That is, in the infrared sensor of the embodiment, the spacer 6 has an opening 6a larger than the window hole 3a and is disposed between part, around the window hole 3a, of a package lid 32 (part, around the opening 5a, of the member 5) and a periphery of the lens 4 (a flange portion 42 in this embodiment). The infrared sensor includes a gap 7 that intervenes between the member 5 and the lens 4 on the inside of the package 3 and has a wider range than the opening 5a of the member 5. The spacer 6 is shaped like a frame and a whole face thereof on a side of the lens 4 is joined to the periphery of the lens 4, and a whole face thereof on a side of the member 5 is joined to the part, around the opening 5a, of the member 5. As a result, in the infrared sensor of the embodiment, an interior space surrounded by the package 3, the lens 4 and the spacer 6 can be formed as an airtight space. In the infrared sensor of the embodiment, the interior space surrounded by the package 3, the lens 4 and the spacer 6 is formed as a dry nitrogen atmosphere, but not limited to this. For example, it may be formed as a vacuum atmosphere.

The gap 7 in the infrared sensor of the embodiment is formed of a hollow space that is shaped like a cylinder and surrounded by the member 5, the lens 4 and the spacer 6.

The opening 5a of the member 5 is formed of the window hole 3a of the package 3 and is shaped like an inversely tapered opening of which size gradually increases in a direction apart from the lens 4. It is preferable that a taper angle of an inside of the opening 5a in member 5 be equal to or less than a value obtained by subtracting, from 90°, an angle that is half the large of a specified view angle.

The infrared sensor of the embodiment includes the lens 4 disposed above an infrared detecting device 1, the member 5 that is disposed at a side of an upper surface 4a of the lens 4 and includes the opening 5a defining an infrared transmission region in the lens 4, and the gap 7 that intervenes between the member 5 and the lens 4 and has a wider range than the opening 5a, like the infrared sensor of the embodiment of FIG. 1. As a result, in the infrared sensor of the embodiment, it is possible to shift an infrared transmission region with respect to an off-axis light incident on the upper surface 4a of the lens 4 from a center to a periphery side of the lens 4, and to decrease an incident angle onto the lower surface 4b of the lens 4, like the infrared sensor of the embodiment of FIG. 1. Accordingly, it is possible to improve a resolution for the off-axis light. Thus, the infrared sensor of the embodiment can suppress the occurrence of an off-axis aberration of the lens 4, like the infrared sensor of the embodiment of FIG. 1.

Figure 7:
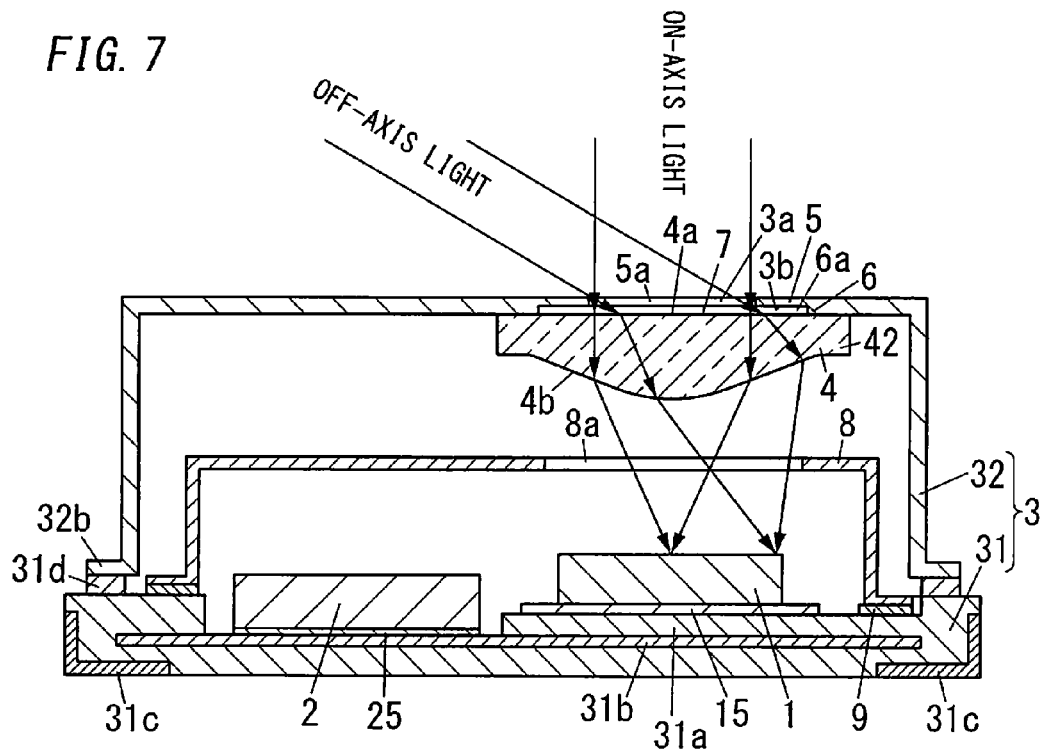
FIG. 7 is a schematic sectional view of an infrared sensor in an embodiment.

Hereinafter, an infrared sensor of an embodiment is explained with reference to FIG. 7.

Figure 6:
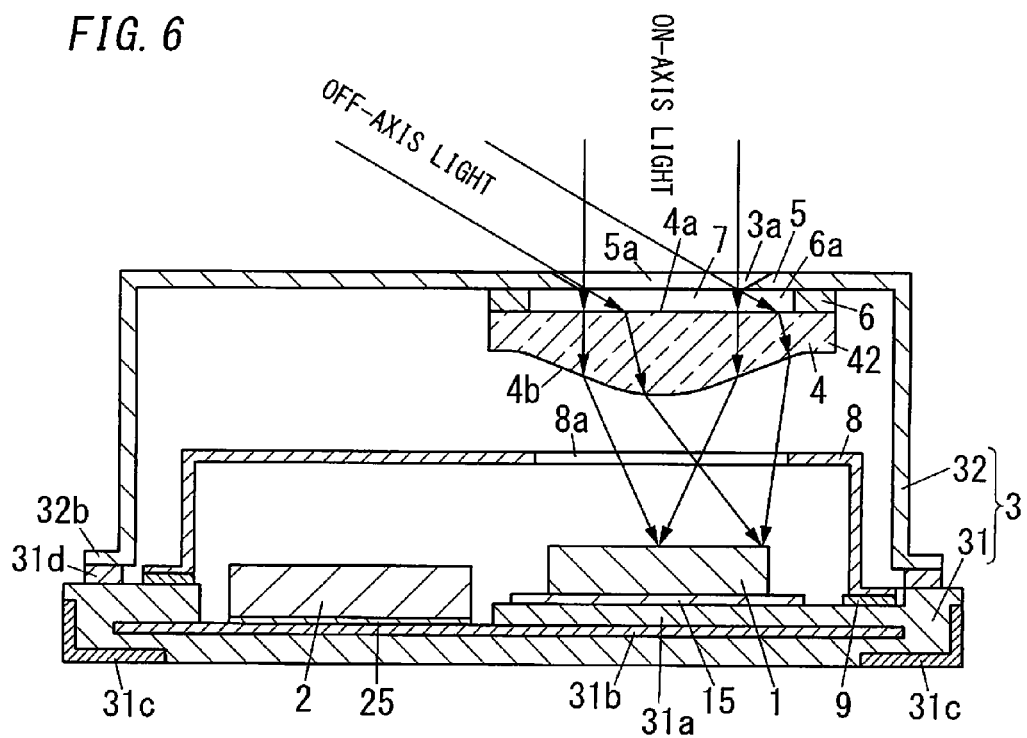
FIG. 6 is a schematic sectional view of an infrared sensor in an embodiment.

The infrared sensor of the embodiment differs from the embodiment of FIG. 6 mainly in that the infrared sensor of the embodiment includes a spacer 6 that is integrally formed in an member 5. Like kind elements are assigned the same reference numerals as depicted in the embodiment of FIG. 6, and explanation thereof is omitted.

The member 5 includes a window hole 3a as an opening 5a like the embodiment of FIG. 6. In the infrared sensor of the embodiment, a recess 3b is provided in part, around the window hole 3a, of the package lid 32 which faces the upper surface 4a of the lens 4. As a result, in the infrared sensor of the embodiment, the spacer 6 is formed of a region, surrounding the recess 3b, of the package lid 32. A thickness dimension of the spacer 6 is the same as a depth dimension of the recess 3b. For example, the recess 3b can be formed by machining the package lid 32. Examples of machining include cutting and the like. The recess 3b may be formed when the package lid 32 is molded.

In the infrared sensor of the embodiment, since the spacer 6 is integrally formed in the member 5, it is possible to reduce the number of components to realize cost reduction and simplification of an assembly process. In the infrared sensor of the embodiment, the spacer 6 is integrally formed in the member 5, and it is thereby possible to increase the precision of relative positions among the lens 4, the spacer 6 and the member 5 and to further suppress an occurrence of off-axis aberration.

In the infrared sensor of the embodiment, the opening 5a of the member 5 has an opening shape of which opening area is uniform regardless of distances from the lens 4 in an optical axis direction of the lens 4, but is not limited to this. It may have an inversely tapered opening shape of which opening area gradually increases in a direction apart from the lens 4.

In the infrared sensor of the embodiment, the spacer 6 is formed by providing the recess 3b in the part, around the window hole 3a, of the package lid 32, but not limited to this. It may be formed by integrally forming a protrusion as the spacer 6 on part, around the window hole 3a, of the package lid 32.

Figure 8:
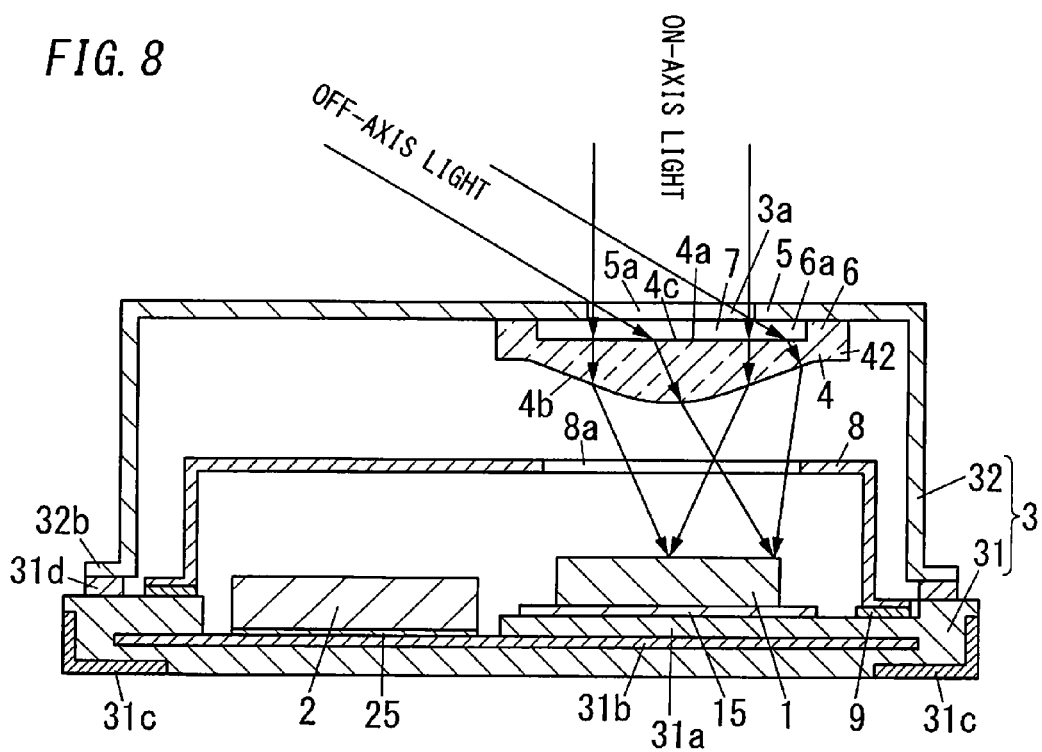
FIG. 8 is a schematic sectional view of an infrared sensor in an embodiment.

Hereinafter, an infrared sensor of an embodiment is explained with reference to FIG. 8.

The infrared sensor of the embodiment differs from the embodiment of FIG. 6 mainly in that the infrared sensor of the embodiment includes a spacer 6 that is integrally formed in a lens 4. Like kind elements are assigned the same reference numerals as depicted in the embodiment of FIG. 4, and explanation thereof is omitted.

In the infrared sensor of the embodiment, a recess 4c is provided in a surface side of the lens 4 that faces a package lid 32 in an optical axis thereof. As a result, in the infrared sensor of the embodiment, the spacer 6 is formed of a region, surrounding the recess 4c, of the lens 4. A thickness dimension of the spacer 6 is the same as a depth dimension of the recess 4c. In the lens 4, an inner bottom of the recess 4c can be an upper surface 4a. In a case where an optical filter film is provided on each side of the upper surface 4a and an lower surface 4b of the lens 4, optical properties of the two optical filter films may be the same as or different from each other. Alternatively, one side of the upper surface 4a and the lower surface 4b of the lens 4 may be provided with an optical filter film, while the other side thereof may be provided with an antireflection film for preventing infrared reflection. The antireflection film may be formed of material similar to the optical filter film, and laminate structure thereof can be designed suitably.

For example, the lens 4 can be formed by a manufacturing method for semiconductor lens adopting the aforementioned anodic oxidation technology. That is, it is preferable that the lens 4 be formed of a semiconductor lens (e.g., a silicon lens or the like). In a manufacturing example of the semiconductor lens, a semiconductor substrate (e.g., a silicon substrate or the like) is prepared. An anode by designing a contact pattern with the semiconductor substrate in accordance with a shape of a desired lens is then formed on a first surface side of the semiconductor substrate so as to form ohmic contact as contact with the semiconductor substrate. A second surface side of the semiconductor substrate is anodized in an electrolytic solution containing a solution for removing, by etching, oxide of constituent element of the semiconductor substrate, thereby forming a porous region to be removed. The porous region is then removed, so that a semiconductor lens is formed. Preferably, the spacer 6 formed of the recess 4c and part around the recess 4c is then formed by etching a forming region of a recess 4c from the first surface side of the semiconductor substrate after the anode on the first surface side of the semiconductor substrate is removed. An optical film such as the aforementioned optical filter film, the antireflection film or the like may be then formed as needed. For example, the aforementioned lens 4 may be obtained by employing a semiconductor wafer (e.g., a silicon wafer) as the semiconductor substrate to form numerous lenses 4 and then separating into individual lenses 4 by dicing or the like.

Examples of etching for forming the aforementioned recess 4c include dry etching and wet etching using a drug solution. Preferably, the wet etching is anisotropic etching dependent on orientation of crystal plane. In a case where a silicon substrate in which the aforementioned second surface is (110) plane or (100) plane is employed as the semiconductor substrate, it is preferable that the wet etching be anisotropic etching dependent on orientation of crystal plane using an alkali solution that is a TMAH (tetra-methyl ammonium hydroxide) solution, a KOH solution or the like.

In the infrared sensor of the embodiment, since the spacer 6 is integrally formed in the lens 4, it is possible to reduce the number of components to realize cost reduction and simplification of an assembly process. In the infrared sensor of the embodiment, the spacer 6 is integrally formed in the lens 4, and it is thereby possible to increase the precision of relative positions among the lens 4, the spacer 6 and the member 5 and to further suppress an occurrence of off-axis aberration.

In the infrared sensor of the embodiment, the opening 5a of the member 5 has an opening shape of which opening area is uniform regardless of distances from the lens 4 in an optical axis direction of the lens 4, but is not limited to this. It may have an inversely tapered opening shape of which opening area gradually increases in a direction apart from the lens 4.

Each infrared sensor of the aforementioned embodiments includes an IC device 2 and a cover member 8 inside a package 3, but may be a configuration without the IC device 2 and the cover member 8. And, the member 5 may not integrally formed with the spacer 6. Therefore, a composition of the member 5 may be different from a composition of the spacer 6. For example, when the member 5 is made of silicon and the spacer 6 is made of silicon, the composition ratio of silicon may be different from each other.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An infrared sensor, comprising:
an infrared detecting device;
a lens disposed above the infrared detecting device;
a member that is disposed on an upper surface of the lens and includes an opening;
a gap that is disposed between the member and the lens and has a wider range than the opening; and
a package that houses the infrared detecting device,
wherein the package includes a window hole disposed above the infrared detecting device, and the lens is disposed so as to close the window hole.

2. The infrared sensor of claim 1, wherein a width of the window hole is larger than a width of the gap.

3. An infrared sensor, comprising:
an infrared detecting device;
a lens disposed above the infrared detecting device;
a member that is disposed on an upper surface of the lens and includes an opening;
a gap that is disposed between the member and the lens and has a wider range than the opening;
a cover member disposed above the infrared detecting device; and
a package that houses the infrared detecting device and the cover member,
wherein the upper surface of the lens is positioned upper than an upper surface of the package.

4. The infrared sensor of claim 3, wherein
the package has a window hole, and
a side surface of the lens is apart from the package.

* * * * *